No. 867,299. PATENTED OCT. 1, 1907.
A. J. PFLUGER.
CHECK VALVE.
APPLICATION FILED MAR. 31, 1906.

Witnesses
Geo. W. Young,
Walter D. Hickman

Inventor
Anton J. Pfluger.
By Oliphant and Young.
Attorneys

UNITED STATES PATENT OFFICE.

ANTON J. PFLUGER, OF BRILLION, WISCONSIN, ASSIGNOR OF ONE-THIRD TO CHARLES BOETCHER AND ONE-THIRD TO EDWARD H. KLOEHN, OF BRILLION, WISCONSIN.

CHECK-VALVE.

No. 867,299.	Specification of Letters Patent.	Patented Oct. 1, 1907.

Application filed March 31, 1906. Serial No. 309,107.

*To all whom it may concern:*

Be it known that I, ANTON J. PFLUGER, a citizen of the United States, and a resident of Brillion, in the county of Calumet and State of Wisconsin, have invented certain new and useful Improvements in Check-Valves; and I do hereby declare that the following is a full, clear, and exact description thereof.

My invention relates to check valves and is particularly adapted to hydraulic rams, its object being to produce a valve which will under all conditions seat accurately, and at the same time permit simplicity of construction and consequently cheapness in its manufacture, and it consists in certain peculiarities of construction and combination of parts to be fully set forth hereinafter with reference to the accompanying drawings and subsequently claimed.

Figure 1:
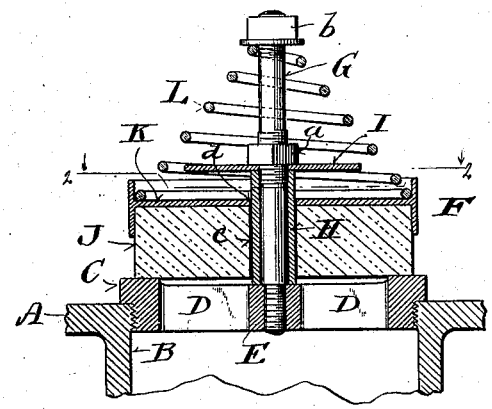
Figure 2:
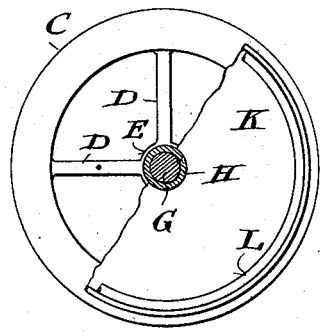

In the drawings: Figure 1, is a vertical section of my improved valve, and Fig. 2, a plan view of the same with parts broken away and in section as indicated by line 2—2 of Fig. 1.

Referring by letter to the drawings A is a fragment of a chamber provided with a port opening B threaded into said opening is a valve seat C which is preferably of non-corrosive metal, the spider arms D of which support a hub E, said arms and hub being slightly below the seating face so as not to interfere with the proper seating of the valve F. A stem G is threaded and shouldered into the hub E of the valve seat, and a spacing thimble H is slipped over the stem and rests upon said hub, this thimble is of sufficient length to permit full opening of the valve F, and is capped by a disk I, against which said valve strikes when lifted, there being a nut run on a threaded portion of the stem G to bind the disk and spacing thimble securely to the hub E. The valve F has its working face composed of a thick rubber ring J surmounted by a metal cap K which is cupped in either direction, the lower half encircles the ring J to which it is secured by any suitable means, and the upper half forms a recess into which rests the base of a helical spring L, this spring at its smaller or upper end is confined by an adjusting nut $b$ threaded on the stem G, and as shown the central opening $c$ of ring J together with the opening $d$ in the cap K fit the thimble H and guides the valve in its opening and closing.

By the above description it will be noticed by the construction that a great length of spring is obtained and a stop which limits the movement of the valve to its full opening, are all controlled by the central stem which also serves as a guide, the whole arrangement combining to produce a simple and effective valve for various fluids.

Having thus described my invention, what I claim as new and desire to secure by Letters-Patent is:

In a check valve, a seat therefor having a central hub and supporting spider arms, a stem fitted in said hub, a spacing sleeve provided with an upper disk, a retaining nut threaded on the stem and adapted to bind said sleeve and disk between the nut and aforesaid hub, a valve having a rubber face, and metal cup piece provided with flanges in either direction and adapted to slide on the sleeve of said stem, a helical spiral spring above said cap piece, and a retaining nut fitted upon the aforesaid stem whereby the spring tension is regulated.

In testimony that I claim the foregoing I have hereunto set my hand at Brillion in the county of Calumet and State of Wisconsin in the presence of two witnesses.

ANTON J. PFLUGER.

Witnesses:
S. H. BARNARD,
WM. HOENIG.